United States Patent [19]

Singh

[11] Patent Number: 4,698,003
[45] Date of Patent: Oct. 6, 1987

[54] TIRE CURING PRESS

[75] Inventor: Anand P. Singh, Youngstown, Ohio

[73] Assignee: NRM Corporation, Columbiana, Ohio

[21] Appl. No.: 900,809

[22] Filed: Aug. 27, 1986

[51] Int. Cl.$^4$ .............................................. B29C 35/00
[52] U.S. Cl. ........................................ 425/52; 425/58
[58] Field of Search ..................... 425/28 R, 28 P, 33, 425/49, 51, 52, 53, 40, 43, 80, 58, 32, 36

[56] References Cited

U.S. PATENT DOCUMENTS 4,527,946 7/1985 Singh et al. .......................... 425/33

Primary Examiner—Willard E. Hoag
Attorney, Agent, or Firm—Renner, Otto, Boisselle & Lyon

[57] ABSTRACT

A tire curing press incorporates an improved seal assembly for the center mechanism or bladder assembly. The bottom or lower clamp ring assembly for the shaping bladder is normally threaded on a hub. The hub and ring assembly include cylindrical telescoping surfaces and axially facing surfaces with an O-ring or seal ring provided between the former and a harder bumper ring provided between the latter. The present invention eliminates the seal between the cylindrical surfaces and provides between the axially facing surfaces a special seal assembly which includes an annular sealing plate with a low coefficient of friction and two sealing O-rings on each side thereof. The seal assembly prevents "blow-by" and makes the parts easier to assemble and disassemble under various temperature conditions.

9 Claims, 5 Drawing Figures

TIRE CURING PRESS

This invention relates generally to a tire curing press and more particularly to a seal assembly for the center mechanism or shaping bladder of such press.

BACKGROUND OF THE INVENTION

In tire curing presses center mechanisms are employed which include a shaping bladder which is inserted into the green tire as the press closes initially to shape the tire, and through which hot curing media, such as steam, is circulated under high pressure to cure the tire. Shaping bladders are open at the bottom and the lower edge or bead is held by a clamp ring assembly mounted on a hub. Bladders may also be open at the top with the top bead held by a clamp ring assembly mounted on a manipulating post. The curing media enters and drains from the bladder through the hub. Because of a relatively short service life, shaping bladders in tire presses must periodically be replaced.

The bottom or lower clamp ring assembly for the shaping bladder is normally threaded on the hub. The hub and ring assembly include cylindrical telescoping surfaces and axially facing annular surfaces with an O-ring or seal provided between the former, and a harder bumper ring provided between the latter. The purpose of the bumper ring is to prevent metal-to-metal contact at the axially facing surfaces and thus avoid seizure which might be brought on by thermal expansion or contraction of the parts. Because of the latter problem the cylindrical surfaces require a significant clearance necessary to install, for example, a cold lower clamp ring assembly over a hot tub. Such clearances are necessary since operating temperatures may range from 300° to 400° F. To wait for the hub to cool down would require an inordinate amount of down-time for the press and would be grossly energy inefficient. However, because of the required clearances the seals may become ineffective at such operating temperatures permitting what is known as "blow-by". This can lead to defective tires as well as other significant problems.

Also, such bumper rings are normally installed in shallow grooves in such axially facing surfaces. Such rings in what may be a short period of time become crushed and lose not only any sealing capability, but also may fail to function to prevent the noted metal-to-metal contact. Crushed bumper rings are not easy to spot.

An example of such prior art seal ring and bumper ring design is shown in prior U.S. patent of Anand P. Singh et al U.S. Pat. No. 4,527,946 issued July 9, 1985.

SUMMARY OF THE INVENTION

With the present invention the non-static seal between the large clearance telescoping cylindrical surfaces of the hub and ring assembly is eliminated, and a special sealing ring plate between the axially facing surfaces is provided, such plate being made of a hard metallic or non-metallic material with a low coefficient of friction. The plate has a substantial annular area which avoids crushing, and two static face seals or O-rings are provided on opposite sides of the plate in effective groove sizes. In the preferred form of the invention the grooves are provided in the axial face of the hub and the axial face of the plate, so that the plate and seals remain with the hub upon changing of the bladder. It will of course be appreciated that other forms of the plate and seal assembly may be provided.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
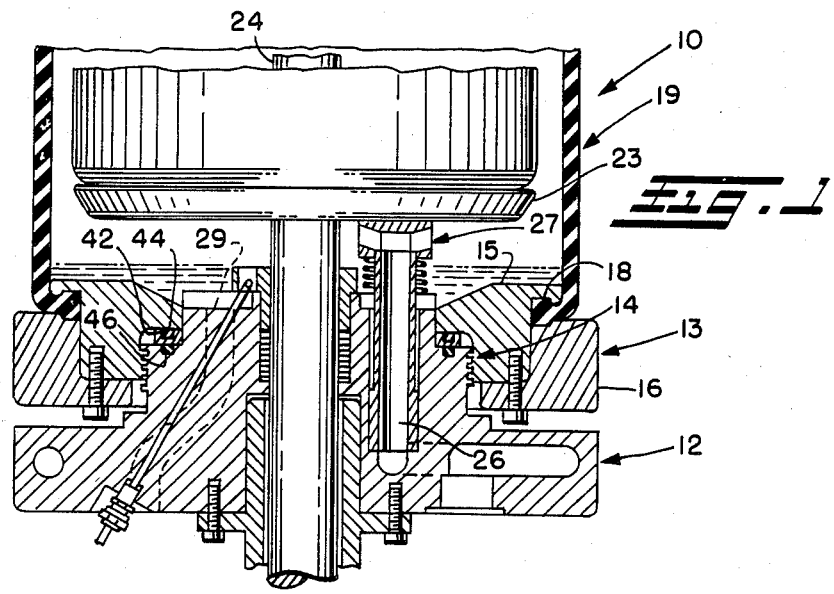
FIG. 1 is a fragmentary vertical section through a post type center mechanism of a tire press in accordance with the present invention.

Referring now to the annexed drawing and more particularly to FIG. 1 there is illustrated a center mechanism for a tire press shown generally at 10. The center mechanism is mounted in the center of the lower mold section. The center mechanism includes a hub 12 on which a lower bladder clamp ring assembly 13 is threadedly secured as indicated at 14. The bladder clamp ring includes two parts 15 and 16 which secure therebetween the bottom bead 18 of the shaping bladder 19 of the center mechanism.

Figure 2:
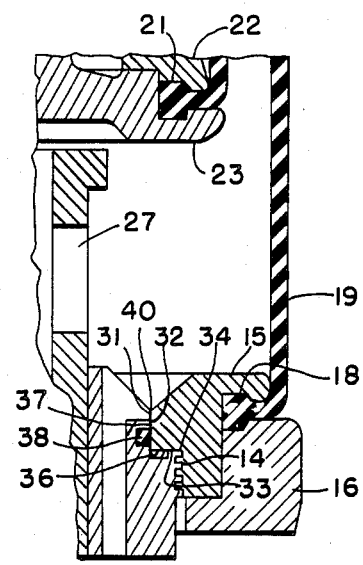
FIG. 2 is an enlarged similar fragmentary section of the prior art.

As in prior art FIG. 2 top bead of the bladder at 21 is clamped between parts 22 and 23 which are in turn secured to manipulating post 24. As noted the upper bladder clamp assembly is smaller in diameter than the lower bladder clamp assembly permitting the top of the bladder to be drawn into the bottom of the bladder. Also, the entire assembly may be vertically movable.

As indicated in FIG. 1, the shaping or curing media enters through the hub through passage 26 and moves into the bladder through pop-up rotating nozzle assembly 27, the details of which may be seen in the aforenoted U.S. patent. The hub also includes a drain exit port indicated at 29. Accordingly, the hub and in fact the entire assembly becomes quite hot in operation.

Referring now to FIG. 2 it will be seen that conventionally the lower bladder clamp ring assembly part 15 which includes the threads 14 is provided with a cylindrical surface 31 which telescopes over cylindrical surface 32 of the hub assembly. Also the part 15 is provided with a circular radially extending face 33, while the hub is provided with a ledge or shelf face 34 opposed thereto. The shelf is conventionally provided with a shallow groove in which a bumper ring 36 is positioned. Also, the cylindrical surface 32 of the hub is provided with a groove 37 in which is situated an O-ring seal 38.

The bumper ring is made of a harder material than the O-ring and is designed to prevent metal-to-metal contact between the hub and the clamp ring 15. Because of the temperature, such metal-to-metal contact could cause the parts to seize preventing disassembly. Also, in time, the bumper ring gets crushed and loses any sealing capability.

Because of the temperatures involved, a significant clearance is required between the telescoping surfaces 31 and 32 as indicated at 40. With such required clearances, the O-ring seal 38 may then not be effective after a cold clammp ring assembly has been installed resulting in what is known as "blow-by". Also, the ring 36 if crushed or damaged may not function to avoid the metal-to-metal contact. Moreover, such damage may not readily be apparent and such bumper rings are difficult to remove and replace.

Figure 3:
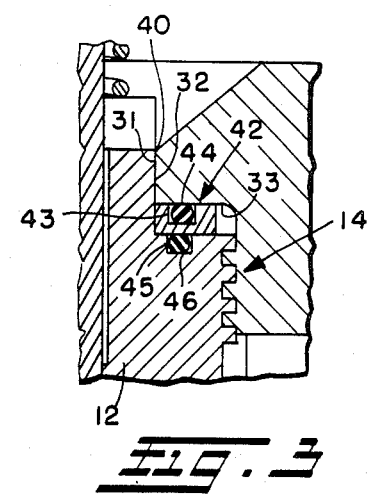
FIG. 3 is an enlarged fragmentary vertical section of a preferred form of the present invention.
Figure 4:
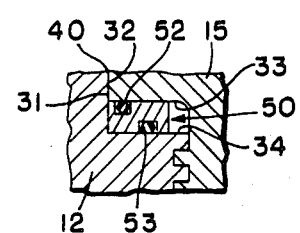
FIG. 4 is a similar vertical section of another embodiment.
Figure 5:
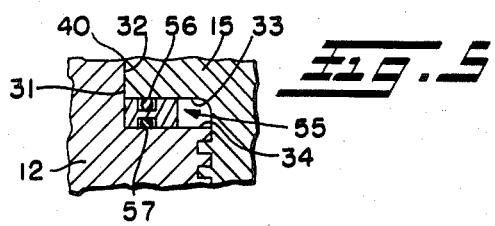
FIG. 5 similarly illustrates yet another embodiment.

Referring now to the present invention as seen in FIGS. 3, 4 and 5 it will be seen that the telescoping surfaces 31 and 32 having the significant clearance 40 are free of any seals. Between the axially facing surfaces 33 and 34 there is provided a ring plate seen at 42 which is made of a metallic or non-metallic material with a low coefficient of friction. An example of a metallic material would be bronze. An example of a non-metallic material would be a high temperature plastic with a high degree of lubricity. The plastic may be reinforced. The upper surface of the ring 42 is provided with an annular groove 43 in which is positioned an O-ring seal 44. The surface 34 is also provided with an annular groove 45 in which is positioned O-ring seal 46. Thus both sides of the plate 42 are sealed with respect to the opposing surfaces 33 and 34. It is noted that such seals are static in nature being compressed by the two facing surfaces. There are then no telescoping surfaces which might tend to roll an O-ring out of its seating groove.

Referring now to FIG. 4 there is illustrated a sealing plate 50 between the surfaces 33 and 34 which is provided with two O-ring and groove assemblies indicated at 52 and 53 in its opposite faces. The grooves and O-rings are radially offset.

In FIG. 5 the sealing ring 55 is provided with rings and receiving grooves 56 and 57 in opposite faces which are not radially offset but rather axially aligned. In FIG. 3 the sealing plate has a U-shape configuration in radial section. In FIG. 4 the sealing ring has a laying down S sectional configuration while in FIG. 5 the sealing ring is in the configuration of an H in radial section. In all such embodiments, the telescoping surfaces 31 and 32 have a significant clearance and are free of seals.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A center mechanism including a shaping bladder for a tire curing press comprising a bottom hub, a clamp ring assembly for the bladder, said clamp ring assembly and hub including cylindrical telescoping surfaces, and opposed axially facing surfaces, a sealing plate ring between said axially opposed facing surfaces, and static seal rings on axially opposite sides of said sealing plate ring and the respective axially opposed facing surfaces.

2. A center mechanism as set forth in claim 1 wherein said sealing plate ring comprises a ring of metallic or non-metallic material with a low coefficient of friction.

3. A center mechanism as set forth in claim 2 wherein said sealing plate ring comprises a generally U-shape in radial section plate having a groove in the top surface thereof, with a static O-ring seal in such groove.

4. A center mechanism as set forth in claim 3 wherein said hub has a groove in its facing surface with a static O-ring seal therein adapted to engage said sealing plate.

5. A center mechanism as set forth in claim 2 wherein said sealing plate ring has a groove in each of the opposite axial surfaces thereof.

6. A center mechanism as set forth in claim 5 wherein said grooves are axially aligned.

7. A center mechanism as set forth in claim 5 wherein said grooves are axially offset.

8. A center mechanism as set forth in claim 1 wherein said cylindrical telescoping surfaces are formed with substantial clearance.

9. A center mechanism as set forth in claim 8 wherein said cylindrical telescoping surfaces are free of fluid seals.

* * * * *